United States Patent [19]
Howe

[11] Patent Number: 5,094,706
[45] Date of Patent: Mar. 10, 1992

[54] METHOD OF MAKING CONTROLLED HEATING BAKING PAN

[75] Inventor: David J. Howe, Milford, Mass.

[73] Assignee: The Procter & Gamble Company, Cincinnati, Ohio

[21] Appl. No.: 630,512

[22] Filed: Dec. 20, 1990

Related U.S. Application Data

[62] Division of Ser. No. 467,932, Jan. 22, 1990, Pat. No. 5,004,121.

[51] Int. Cl.$^5$ .................. B29C 43/20; B65D 90/04
[52] U.S. Cl. ............................ 156/214; 156/224; 156/228; 156/242; 156/245; 220/454; 220/458; 220/660; 220/912; 219/10.55 E; 219/10.55 F; 99/447; 99/DIG. 14; 99/426; 229/2.5 R; 264/257
[58] Field of Search ............ 156/214, 224, 228, 242, 156/245; 264/257, 259, 292, 541, 549, 550, 551, 554; 220/454, 458, 660, 912; 219/10.55 E, 10.55 F; 99/426, 447, DIG. 14; 229/2.5 R

[56] References Cited

U.S. PATENT DOCUMENTS

| | | | |
|---|---|---|---|
| Re. 32,270 | 10/1986 | Murray | 428/335 |
| 2,274,095 | 2/1942 | Sawyer | 156/224 |
| 2,590,221 | 3/1952 | Stevens | 156/224 |
| 2,646,380 | 7/1953 | Barlow et al. | 156/245 |
| 3,033,434 | 5/1962 | Carson | 229/2.5 |
| 3,423,267 | 1/1969 | Munk | 156/214 |
| 3,612,036 | 10/1971 | Kaufman | 126/390 |
| 3,657,044 | 4/1972 | Singer | 156/214 |
| 3,697,369 | 10/1972 | Amberg et al. | 156/224 |
| 3,777,094 | 12/1973 | Peters | 219/10.49 |
| 3,941,967 | 3/1976 | Sumi et al. | 219/10.55 E |
| 3,971,361 | 7/1976 | Hurko | 126/390 |
| 3,995,763 | 12/1976 | Ayres et al. | 220/74 |
| 4,003,368 | 1/1977 | Matel | 126/390 |
| 4,058,214 | 11/1977 | Mancuso | 206/545 |
| 4,143,647 | 3/1979 | Husslein et al. | 126/390 |
| 4,147,836 | 4/1979 | Middleton et al. | 156/224 |
| 4,167,233 | 9/1979 | Hare | 220/72 |
| 4,183,435 | 1/1980 | Thompson et al. | 206/557 |
| 4,306,133 | 12/1981 | Levinson | 219/10.55 E |
| 4,308,985 | 1/1982 | Manizza et al. | 229/31 |
| 4,349,124 | 9/1982 | Faller | 220/453 |
| 4,349,146 | 9/1982 | Holden | 229/2.5 |
| 4,351,997 | 9/1982 | Mattisson et al. | 219/10.55 E |
| 4,543,280 | 9/1985 | Fujita et al. | 220/458 |
| 4,616,762 | 10/1986 | Alexander | 220/74 |
| 4,646,777 | 3/1987 | Baggiolo | 126/373 |
| 4,859,822 | 8/1989 | Ragusa et al. | 219/10.55 E |
| 4,883,936 | 11/1989 | Maynard et al. | 219/10.55 |
| 4,888,459 | 12/1989 | Keefer | 219/10.55 E |
| 4,906,806 | 3/1990 | Levinson | 219/10.55 E |

*Primary Examiner*—Caleb Weston
*Attorney, Agent, or Firm*—Haverstock, Garrett and Roberts

[57] ABSTRACT

A non-metallic unitary baking pan, and especially a baking pan made of plastic, including foam plastic, paper or plastic laminated paper in which a cake or cake-like product can be baked, which baking pan has portions thereof which are thicker and have greater insulating effect than other portions to more uniformly and evenly distribute the heat produced during the baking operation throughout the cake batter or dough being baked. Also disclosed is method for producing such a non-metallic unitary baking pan by means of heated mating dies under pressure the mating dies having portions spaced farther apart than other portions thereof to produce corresponding thicker portions in the pan so formed.

13 Claims, 2 Drawing Sheets

METHOD OF MAKING CONTROLLED HEATING BAKING PAN

This is a continuation of copending application Ser. No. 07/467,932 filed on Jan. 22, 1990, now U.S. Pat. No. 5,004,121.

The present invention relates to means to predeterminately control and uniformly distribute the heat in a product being baked in a baking pan, and more particularly to a baking pan having portions with different insulating properties selectively located so as to slow down the baking of some portions of the product relative to others to more uniformly bake the product. The invention has particular application to baking pans having contoured or sculptured surface characteristics to be imparted to a cake or like product, which pans if made of uniform thickness and of paper or plastic will produce undesirable uneven baking of the product.

BACKGROUND OF THE INVENTION

One of the problems when baking with conventional baking pans of uniform thickness and insulating characteristics is that a product baked therein will have certain portions that will be heated more than other portions. This is especially true of certain portions of a product such as the side and edge portions, and it is also true of indentations and areas with sharply divergent contours and especially concave areas where heat will be trapped and will cause those portions of the product or cake being baked to heat more than other portions. This can result in excessive rise of the batter or dough especially near the center of a cake being baked and can give the cake a odd shape which is difficult to compensate for especially when the cake is overturned and is in condition to be iced or frosted. These problems are exacerbated when the products to be baked have shapes such as a contoured shape of a character, a face, or some other three dimensional shape or design. With the present pan construction having portions of different thickness and insulating characteristics those portions with the greatest insulation will slow down or reduce the heat transferred to the corresponding areas of the batter/dough and consequently will slow the speed of cooking or baking in those areas resulting in a more uniform heat distribution in the product as it is baked. In the past, various types of insulating inserts, of metallic or other materials, laminated structures, and other means have been used for this purpose. Such means have been positioned on or in the baking pan itself in order to slow down the baking in certain portions more than in others. One such device is disclosed in Kaufman U.S. Pat. No. 3,612,036. This and other prior art devices, however, have not resulted in uniformly baked products throughout, they have not eliminated the problem of "center rise", and such means have not generally been adopted by the industry or by baking pans used for home baking. Such known constructions have also been expensive to construct, and their use has been limited to certain types of products and therefore they have not had general usage for baking products of a particular size or shape.

In the current market, it is often necessary to design a baking pan that is suitable for use in a microwave oven as well as in a conventional baking oven. To meet these requirements means that baking pans must not be made of metal because metals are not transparent to microwave energy and might damage the oven if positioned in a microwave oven. It is also desirable to be able to develop a baking pan which has the desirable characteristics set forth above that can also be made relatively cheaply and be able to be mass produced so that they can be used in conventional baking ovens as well as in microwave ovens. It is also desired when selling prepackaged baking products to be baked to be able to include a disposable baking pan and especially one that is suitable for use in both types of ovens. For many such uses, a disposable pan formed of a relatively thin plastic material that is not damaged at the usual cooking temperature is supplied. In other instances a paper baking pan or a paper baking pan having a layer of plastic material applied to one or both surfaces thereof are used, but so far as known nobody provides such a baking pan which has different thickness or insulated portions. Relatively thin plastic baking pans that have uniform thickness throughout are not altogether satisfactory because they do not provide uniform baking of the dough and may actually accentuate the problems produced by uneven temperature distribution especially when they are used in relatively rapid baking procedures. This problem is further exacerbated if the pan has a sculptured pattern formed in the surface thereof which is the surface that becomes the top surface of the baked product. Consequently, uneven rising of the baking dough with portions being overbaked and portions being underbaked results. These conditions can also produce an objectionable crown near the center of the top of the dough as it is baking thereby adding to the distortion of the finished product. These effects are undesirable in most baked products and are especially objectionable in products such as cakes including layered cakes where it is desired to produce a certain shape before the icing or frosting is applied. The problems described will be accentuated in cakes formed of mulitiple layers wherein each of the different layers is baked in a separate pan and vertically assembled during the icing or frosting operation.

It is becoming popular to bake cakes with distinctive profiles on their upper surfaces such as the profile of a distinctive design character or other sculptured shape. The shape that is desired is produced as a result of the shape of the bottom of the pan in which it is baked. Once the product has been baked and cooled the pan is overturned so that the baked product will fall out of the pan and have its sculptured surface appear as the upper surface of the cake. If the sculptured shape of the pan has inwardly or outwardly sharply protruding regions these regions being thinner will be baked and dried more than other areas of the batter or dough. In order to make the batter/dough cook uniformly throughout, including throughout the sharply sculptured portions, the present invention teaches thickening the plastic or paper pan in the area of outwardly and inwardly protruding portions so that the protruding portions will be somewhat more insulated from the heat and therefore will receive about the same amount of baking as the rest of the product. If this is not done the protruding portions of the cake when it is overturned will be brittle and crumbly causing those design portions to break more easily adding to the difficulty of applying a uniform layer of icing or frosting to the cake. The breaking will also destroy the shape that is desired.

SUMMARY OF THE INVENTION

The present invention teaches the construction of a baking pan, and especially a baking pan made of plastic including foam plastic, paper and plastic laminated paper in which cakes and cake like products are to be baked, which baking pan has portions thereof which are made thicker and therefore have greater insulating effect than other portions to more uniformly and evenly distribute the heat produced during the baking operation throughout the batter/dough being baked.

OBJECTS OF THE INVENTION

A principal object of the invention is to more evenly distribute heat throughout a product being baked.

Another object of the present invention is to provide a baking pan constructed of a plastic, foamed plastic, paper or plastic laminated paper material having selected portions insulated more than other portions to more evenly distribute the heat throughout a product being baked therein.

Another object is to slow the transfer of heat to certain portions of a product being baked more than to other portions in order to more uniformly bake the product.

Another object is to provide a baking pan construction that can be used in conventional baking ovens including baking ovens operating up to about 350° F. or more, which pan is also suitable for baking products in microwave ovens.

Another object is to provide a non-metallic baking pan construction that has selected portions of different heat transfer characteristics.

Another object is to provide a relatively inexpensive baking pan which can be packaged with products to be baked and which will enable the product to be baked in a conventional oven or in a microwave oven.

Another object is to preserve the shape of products being baked.

These and other objects and advantages of the present invention will become apparent after considering the following detailed description of preferred embodiments in conjunction with the accompanying drawings.

DETAILED DESCRIPTION OF THE INVENTION

Figure 1:
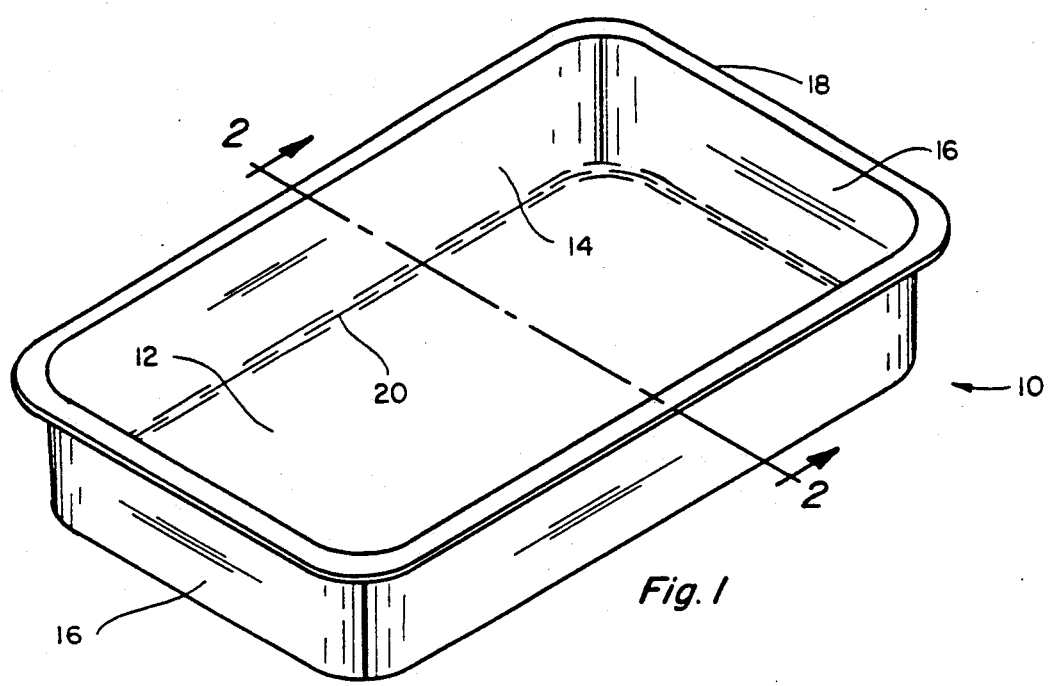
FIG. 1 is a perspective view of a baking pan constructed according to the present invention.
Figure 2:
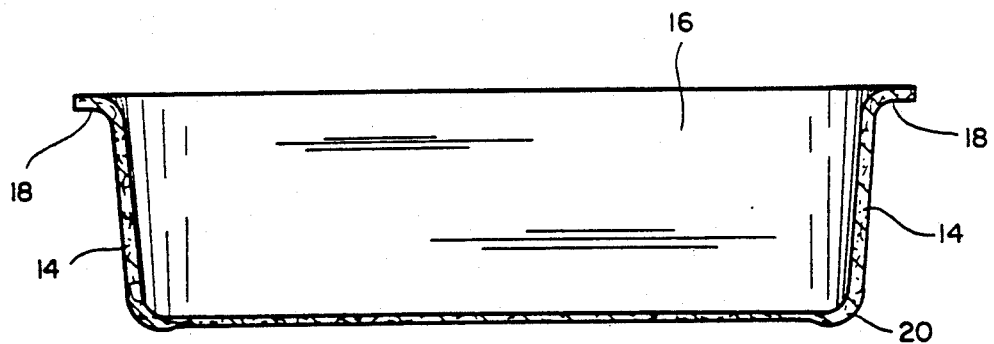
FIG. 2 is a cross-sectional view taken at 2—2 of FIG. 1.

A controlled heating baking pan of the present invention as illustrated in FIG. 1 of the drawings is comprised of a molded or pressed structure 10 which is formed by vacuum molding over a single mold or by pressing two complementary dies together. In the case where the pan is entirely of plastic it can also be formed by injection molding of a plastic or a foamable plastic material. The pan 10 has a bottom wall 12, angularly upstanding side walls 14 and end walls 16. The pan as shown also has a flat flange portion 18 surrounding the tops of the side and end walls. As shown in FIG. 2, selected portions of the bottom wall 12 and of the side and end walls 14 and 16 are molded or press formed to a greater wall thickness than other portions of the pan. For a rectangular shaped pan with generally flat side and bottom surfaces, the portions with the greaest wall thickness will generally be located around the periphery of the bottom wall 12 where the side and end walls are connected. The thickened portions will extend into the walls and some tapering may be desired. The thickened wall portions as detailed above act to insulate the batter/dough from the oven heat thereat and slow the baking thereof adjacent to the thicker wall portions producing a more uniform baking of the batter/dough.

The subject baking pans can be produced from a variety of suitable plastic moldable materials. These materials include temperature resistant plastics such as high temperature or CPET polyester plastic material as well as other plastic molding materials including foamable plastics, moldable paper fibers, certain ceramics such as clay pottery and other food compatible moldable materials. Combinations of such materials including laminates are also suitable such as a molded paper pan with a surface of laminated CPET polyester. Such a laminated combination has the advantage of facilitating the releasability of the baked product therefrom as well as enabling preferred slow baking which is a desired characteristic of molded paper fiber pans. The desired thickness of the molded paper fiber in such pans can be varied by forming the pan in hot press molds using a method described hereinafter.

Figure 3:
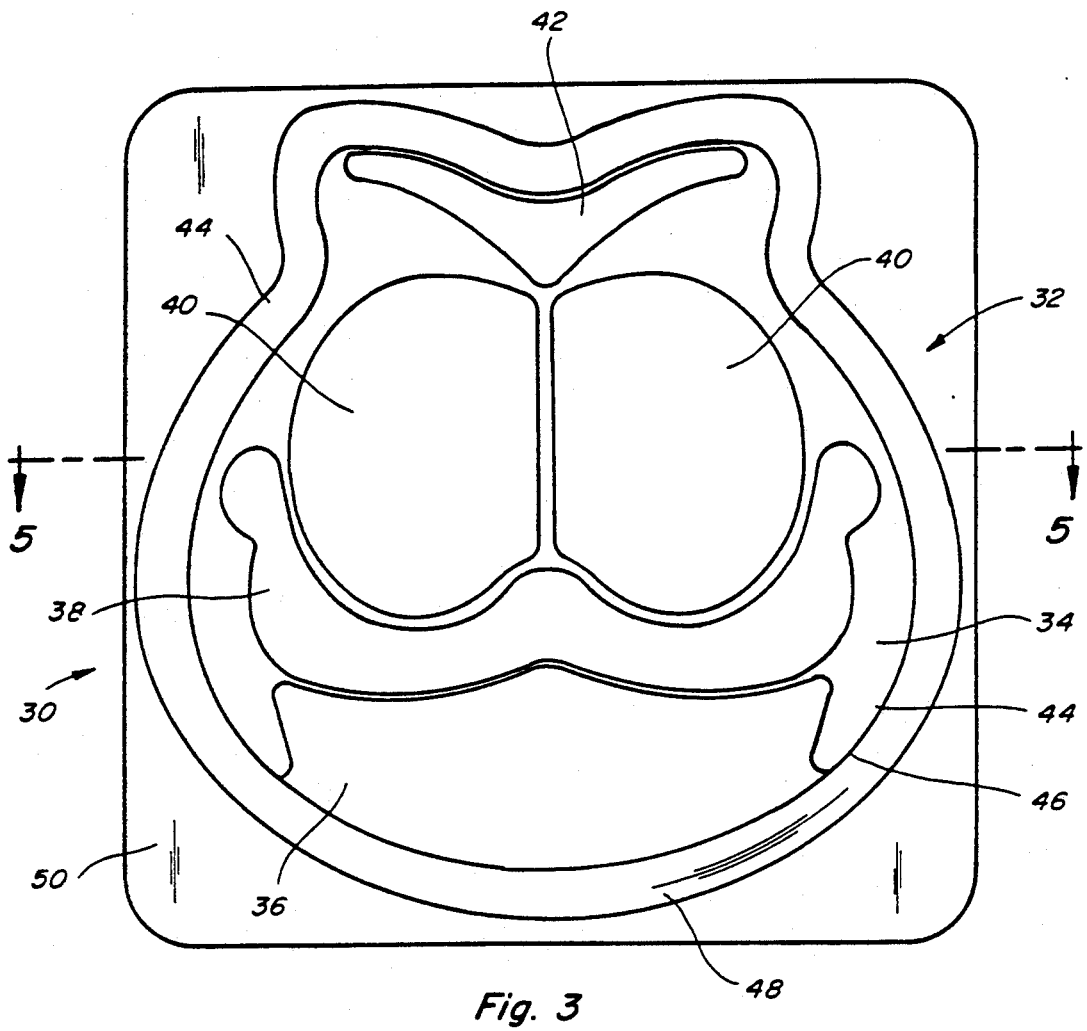
FIG. 3 is a plan view of a profiled baking pan constructed according to the invention.

The present pans can be made to have distinctive surface contours pressed or formed thereon. Of even greater utility is the provision of profiled baking pans to represent some desired shape such as a comic character, an emblem, a design and so forth. Such a pan 30 is shown in FIG. 3. As illustrated therein and in FIGS. 4 and 5, certain features in the design 32 are formed by relatively sharp projections or depressions in the bottom wall surface 34 of the baking pan 30. These pan portions produce raised or indented portions in the finished baked product. The more sharply contoured portions such as portions 36, 38, 40 and 42 are portions that are made thicker to slow the baking thereat relative to other portions to more evenly bake the overall baked product. This slower baking prevents the raised portions of the cake from baking to a too done or dry condition while the thicker base portion thereof is baking to the desired degree of doneness. Also contributing to the more even baking of such profiled baked products is the thicker bottom wall band 44, joindure curve 46 and the side walls 48 of the baking pan which prevents the sides and edges of the baked goods from becoming overdone.

Figure 4:
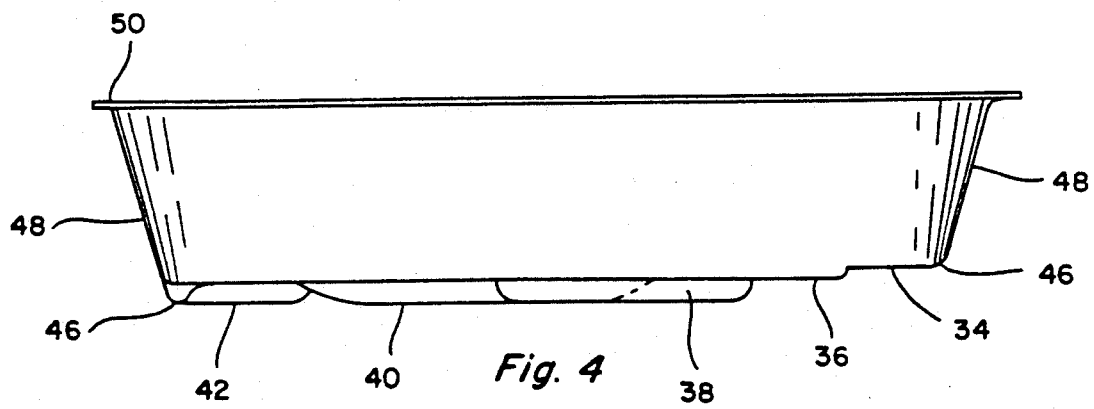
FIG. 4 is a side elevational view of the pan of FIG. 3.
Figure 5:
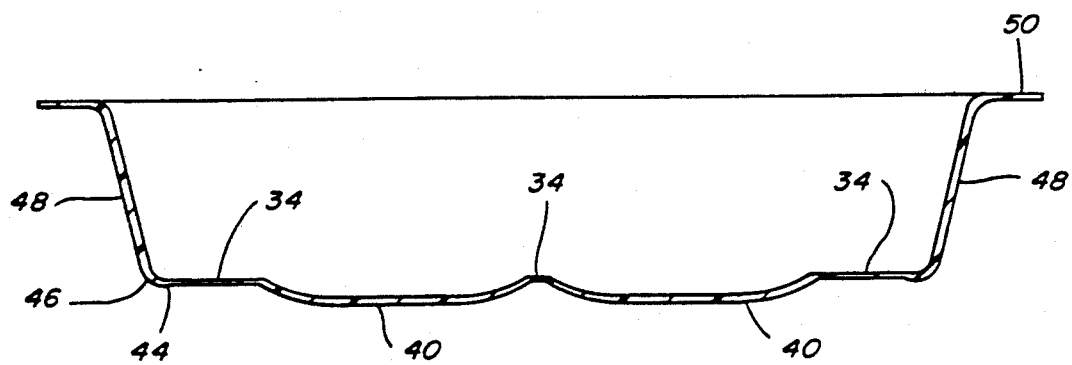
FIG. 5 is a cross-sectional view taken at 5—5 of FIG. 3.

FIGS. 3, 4, and 5 illustrate the locations of thickness variations in a profiled baking pan 30 designed to produce a sculptured shape such as the face of a cartoon character. The bottom of the pan is in the shape or the desired design, which shape becomes the upper surface of the finished cake. In the pan as illustrated the thicker bottom wall portions are located in the deeper pan areas 36–42 which are shown in the eyebrow area 42, the eyes 40, the moustache 38 and the mouth portion 36 of the face. Also there are thickened pan portions in a peripheral band 44 extending around the outside of the bottom wall member and around the radius of the curve 46 between the side wall 48 and at least part way up the side walls 48, most preferably all the way up the side walls 48 up to where the sloping portion of the side wall joins the flanged upper edge portion 50 of the baking pan. When the pan 30 of the design shown is used to bake a cake it is found that the projecting features are not as overbaked as if the pan were of uniform thickness throughout. This also means that the cake is more uniformly cooked and does not have brittle overcooked areas that are as likely to crack or crumble. These are, however, raised to permit accurate icing. This is also true of the cake at its sides and edges because of the thicker band 44, curve 46 and side walls 48. Furthermore, because of the uniformity of the heat during baking the degree of rise or bulging at the center of the cake is lessened or minimized in contrast to cakes baked in pans having uniform wall thickness. Thus, the present baking pan improves the quality and uniformity of certain baked products such as cakes and the like.

The subject improved baking pan construction can be produced by a manufacturing process that is relatively straightforward such as in a press or in a mold, either single or two piece. In the case of a paper pan, a plastic lamination step may also be required. Such processes, can be carried out relatively inexpensively and lend themselves to mass production techniques.

One preferred process for the production of baking pan involves molding paper fibers modified through the use of hot pressure dies which may include the use of steam.

In the initial step of a typical molded paper fiber production process an open mesh wet mold of the desired oversized size and shape is submerged in a paper fiber water slurry or "furnish", which slurry is drawn through the open mesh or screen of the mold until the desired starting thickness of paper fibers is collected thereon then withdrawn and the free water drained therefrom. Thereafter a pressure head or mold vented to allow escape of excess moisture, will be mated with the wet mold under sufficient pressure to partially compress the wet paper fiber to a desired shape. Then a transfer head or a pressure head suitably vented to draw a vacuum on the molded paper fiber piece, separates the piece from the wet mold and places it in a drying nest or upon a flat plate or belt for drying in a drying oven. The steps detailed above produce the virgin or green molded fiber shaped blank which is thereafter subjected to hot pressure molding and/or laminating as desired. Up to this point the present process does not differ in general from that of conventional molded paper fiber article production.

After the molded paper fiber piece is dried, it is subjected to hot, high pressure molding in a two mold hot press tool set which can be heated to a temperature typically above 350° F. In this operation the molded fiber blank is heated under high pressure to consolidate the fibers and produce an impervious final molded shape. In the present process suitably profiled male and female hot molds are employed which will reduce the thickness of the molded blank to the final desired wall thicknesses. Hence, the molds must be prepared so as to provide the desired thickness variations in the side and end walls as well as the bottom wall as described above. This is generally more readily achieved by milling selected portions of the male or the female mold used. If a profiled design is desired the profile can be produced by complementary lower milled portions of the female mold member and/or by raised portions on the male mold. In the pans produced according to this invention those deepened profiled portions are also provided to have thicker bottom and side wall portions than the remaining bottom wall areas by the complementary hot molds. This operation serves to produce the varied wall thicknesses that are desired. The differences in the thickness of the wall portions can range from about 1.25 to 3.0 or more times the wall thickness of the unthickened wall portions, most preferably from about 1.4 to 3.0 times.

If desired for insuring better release of baked products from the pans produced, a plastic sheet layer of heat resistant plastic can be laminated to the finished article. This can be done by providing a vacuum nest as a female mold and heat laminating the heat resistant plastic sheet to the previously hot pressed molded fiber shape by known techniques which usually involve a tool heating temperature of about 350° F. The laminated plastic sheet when used is preferably relatively thin, i.e. about 0.001 to 0.002 inch, to achieve the desired interior pan finish without substantially changing the overall pan shape or thickness. Any suitable temperature resistant plastic film can be used for this purpose, such as, for example, thin sheets of CPET polyester or other temperature resistant plastic sheet film. The provision of such a laminated interior layer in the pans of the present invention is optional, since it has been found that suitable ease of release of finished baked goods can be achieved by greasing and flouring the interior walls of a paper baking pan in a manner well known to cooks and bakers.

It is also contemplated that the surface of the molded paper fiber pan can incorporate fiber sizes or starch fillers which will produce a smooth surface and one that does not require greasing or flavoring for release of the baked goods.

The following examples will serve to further illustrate the production of and improvements in the use of the baking pans of this invention.

EXAMPLE 1

A heat controlled baking pan of this invention is produced by a molded paper fiber process comprising the following steps. A mass of paper fiber is deposited on the screen surface of a female wet mold by submerging in a slurry of dispersed paper fibers and drawing the slurry through the wet mold until the thickness of said fiber of approximately 0.080 to 0.105 inch has been deposited thereon. The wet mold is withdrawn from the slurry, allowed to drain of free water and positioned beneath a complementary vacuum assisted pressure head vented to release excess moisture. The deposited fiber is partially compressed by closing the vacuum head until almost all excess moisture has been vacuum expelled and the thickness of the fiber mat reduced to approximately 0.065 to 0.08 inch. The compressed fiber mat is withdrawn from the wet mold by means of a vacuum transfer head and transferred thereby to a moving belt which moves the compressed fiber mat into and through a drying oven maintained at a temperature of about 350° F. for a sufficient period to fully dry the compressed mat and produce a virgin or "green" fiber pan blank. This blank is reduced in dimensions by the slight shrinkage induced by drying the paper fiber mat to the same thickness and a desired pan size of approximately 7½ × 10 inches with side and end walls 1½ inches high at a draft angle of approximately 15° and a flat flange of about ¼ inch surrounding the top of the side and end walls. A draft angle in the side walls makes for ease in production and is not a requirement for the baking pan. The side walls may be vertical, if desired.

Thereafter the paper fiber pan blank is placed in a hot press tool set of two molds suitably profiled to produce less molding in selected areas of the bottom, side and end walls so as to produce wall sections of about 0.065 to 0.08 inch in these selected areas, i.e. a peripheral band around the bottom wall, the radius of curvature between the bottom wall and the side and end walls and up those walls throughout their height. The remaining portions of the bottom wall as well as the upper flange are molded to about 0.035 to 0.06 inch thickness. The high pressure molds are heated to the temperature of approximately 350° F. and are mounted so as to exert a molding pressure of approximately 600 psi. The molded pan is thereafter laminated on its inside surfaces with a temperature resistant CPET sheet of approximately 0.001 inch thickness, the laminating carried out at approximately 350° F. Then the laminated pan article is steel rule die cut to trim and finish the edges of the top flange.

A baking pan produced by the above process was used along with a substantially similar pan of the same composition produced to a single overall nominal thickness of approximately 0.035 inch. with no thicker wall portions to bake two cakes from the same commercial cake mix using the distributor's cooking and timing instructions. The baking pan of the invention had a nominal thickness of approximately 0.036 inch in the thinner areas and a nominal thickness approximately 0.071 inch in the selected thicker wall areas. A commercial yellow cake mix was prepared according to the distributor's instructions and the liquid mix was divided into the two baking pans filling each to a depth of approximately 1¼ inch. The two mixes were then baked in a conventional gas fired oven at an indicated temperature setting of 325° F. for a baking time of about 25 minutes. The cakes were allowed to cool for 20 minutes and then turned out onto a flat surface for further cooling. In both cases satisfactory edible cakes were produced. The cake baked in the pan of the invention with thicker insulating areas on the side and end walls and about the line of joindure to the bottom wall were found to be less browned on the bottom and sides, the corners were not overcooked to a severely dried state and the cake was overall more moist than the cake baked in the single thickness pan.

EXAMPLE 2

A molded paper fiber baking pan was produced and laminated with 0.001 in layer of CPET polyester sheet on the inside upper surface by the same process as set out in Example 1 above. The overall pan was about 10×10 inches with a pan shaped area of about 9½×9½ inches and 2 inches deep surrounded by an upper flange. The bottom wall of the pan was contoured to represent a cartoon character face with two large eyes about 2¼×3½ inches depressed about ⅜ inch below the bottom wall surface and a large mouth area of about 3×6 inches raised about ¼ inch above the bottom wall surface. Selected areas of the pan surface were produced to a greater thickness of about 0.065 inch, than the predominant thickness of the pan, about 0.045 inch. These included the peripheral side walls from just below the upper flange around and including the curve joining the side walls to the bottom wall, the eye depressions including the side walls thereof and the side walls of the raised mouth area.

The above pan with the thicker insulating areas was used to bake a cake along with a profiled pan of temperature resistant polyester CPET which had a uniform thickness in all areas. A commercial yellow cake mix was prepared according to the distributor directions and divided between the two baking pans filling each to about 1½ inches. The two mixes were baked in a conventional gas oven at an indicated temperature setting of 325° F. for periods of about 25 minutes for the cake in the all plastic pan and about 30 minutes in the molded paper varied thickness pan, since the paper pan has been found to conduct heat more slowly. After cooling, the cakes were turned out on a flat surface. The cake baked in the molded paper fiber pan of the invention was more evenly done, showed less browning on the sides and edges and less cracking or crumbling of the raised portions of the contoured top of the cake than the cake baked in the uniform thickness all plastic pan.

EXAMPLE 3

A molded paper fiber baking pan laminated with a 0.001 thick sheet of CPET polyester having the character face design shown in FIG. 3 was produced by the same process as set out in Example 1. The overall pan had a thickness of about 0.045 inch while the indicated depressed profile areas and the side walls had a thickness of about 0.065 inch. This pan when used to bake a test cake in same manner as in Example 2 above produced a cake of proper doneness in about 30 minutes baking time. The cake showed no cracking or crumbling of the raised profile portions which were not overdry or over browned and was in general very satisfactory.

Thus there has been shown and described the controlled heating baking pans and a method for the production thereof that fulfill the objects of the present invention. It will be apparent to those skilled in the art, however, that many changes, modifications, variations, uses and applications for the subject pans and method are possible, and all such changes, modifications, variations, uses and applications which do not depart from the spirit and scope of the invention are deemed to be covered by the invention which is limited only by the claims which follow.

I claim:

1. A method for producing a non-metallic paper fiber baking pan of unitary construction having thickened portions distributed over the area thereof so that when used to bake a product the distribution, size and placement of the thickened portions will cause the heat reaching the product to be relatively uniformly distributed over the area thereof comprising:

forming a sheet of paper fibers into a desired pan form shape, placing the formed sheet between a pair of mating heated dies of desired shape and at substantial pressure to form the shape of the pan therebetween, the mating dies having portions that are spaced further apart than other portions by amounts of at least about 1.25 times in areas where the product to be baked therein is subjected to the greatest concentration of heat during baking, the distribution, size and placement of the thickened pan portions depending on the contour of the pan to produce correspondingly thicker portions of the pan formed therebetween and are such as to cause heat reaching the product to be relatively uniformly distributed over the area thereof, opening the space between the dies and releasing the molded pan from said dies, and trimming the edges of said molded pan to produce a finished pan product.

2. The method of claim 1 including the further step of applying a layer of plastic material to at least one surface of the pan.

3. The method of claim 1 including the further step of cooling the pan after release from the dies to a temperature less than about 325° F. before trimming the edges thereof.

4. The method of claim 1 wherein said thicker portions of the molded pan have a thickness ranging from at least about 1.4 up to 3.0 times the thickness of other portions thereof.

5. The method of claim 1 wherein at least one of the dies has material removed from surface areas thereof to form said thicker portions of the pan.

6. The method of claim 1 wherein said dies are heated to a temperature of at least about 350° F. during a pan forming operation.

7. The method of claim 1 wherein said dies are pressured to a pressure of at least about 600 psi during a pan forming operation.

8. The method of claim 1 wherein the formed, sheet of paper fibers is a dried "green" pan form of water laid paper fibers.

9. The method of claim 8 wherein the finished pan product is capable of withstanding temperatures at least as high as about 400° F. without deforming.

10. A method for producing a molded paper fiber baking pan of unitary construction having thickened portions distributed over the area thereof so that when used to bake a product the distribution, size and placement of the thickened portions will cause the heat reaching the product to be relatively uniformly distributed over the area thereof comprising:

forming a sheet of paper fibers into a pan form shape having a bottom surface and an endless connected side wall, placing the formed sheet between a pair of mating heated dies and exerting substantial pressure on said dies to form the shape of the pan therebetween, the mating dies having portions spaced further apart than other portions thereof by at least about 1.25 times in areas where the product to be baked therein is subjected to the greatest concentration of heat during baking, the distribution, size and placement of the thickened pan portions depending on the contour of the pan so as to produce correspondingly thicker portions of the pan formed therebetween to cause heat reaching the product to be relatively uniformly distributed over the area thereof and releasing the molded pan from said dies.

11. The method of claim 10 wherein the formed sheet of paper fibers is a dried "green" pan form of water laid paper fibers.

12. The method of claim 10 including the additional step of applying a layer of plastic material to at least one surface of the molded pan.

13. A method for producing a baking pan of unitary construction having thickened portions distributed over the area thereof so that when used to bake a product they will cause the heat reaching the product to be relatively uniformly distributed over the area thereof comprising:

forming a sheet of plastic material capable of withstanding temperatures at least up to about 400° F. for sustained periods without deforming into a pan form shape having a bottom surface and an endless connected side wall, placing the formed sheet between a pair of mated heated dies and exerting substantial pressure on said dies to form the shape of the pan therebetween, the mating dies having portions spaced further apart than other portions thereof by at least about 1.25 times in areas where the product to be baked therein is subjected to the greatest concentration of heat during baking, the distribution, size and placement of the thickened pan portions depending on the contour of the pan so as to produce correspondingly thicker portions of the pan formed therebetween and are such as to cause heat reaching the product to be relatively uniformly distributed over the area thereof, and releasing the molded pan from said dies.

* * * * *